United States Patent [19]

Bielfeldt

[11] Patent Number: 4,832,672

[45] Date of Patent: May 23, 1989

[54] PRECOMPACTION BELT

[75] Inventor: Friedrich B. Bielfeldt, Eppingen, Fed. Rep. of Germany

[73] Assignee: Maschinenfabrik J. Dieffenbacher GmbH & Co., Eppingen, Fed. Rep. of Germany

[21] Appl. No.: 147,480

[22] Filed: Jan. 25, 1988

[30] Foreign Application Priority Data

Feb. 2, 1987 [DE] Fed. Rep. of Germany ....... 3702996

[51] Int. Cl.⁴ ............................................... F16G 1/10
[52] U.S. Cl. .................................... 474/260; 198/847; 428/137; 474/249
[58] Field of Search .......................... 474/260–268; 198/847, 846, 844, DIG. 957; 428/137, 138, 246, 260, 261

[56] References Cited

U.S. PATENT DOCUMENTS 1,770,301  7/1930  De Bruin .............................. 474/249
3,738,859  6/1973  Anderson et al. .................. 198/847

FOREIGN PATENT DOCUMENTS 2028493  12/1971  Fed. Rep. of Germany ...... 474/268
 649100  12/1928  France ................................ 474/249

Primary Examiner—Thuy M. Bui
Attorney, Agent, or Firm—Foley & Lardner, Schwartz, Jeffery, Schwaab, Mack, Blumenthal & Evans

[57] ABSTRACT

The invention relates to a precompaction belt for continuously operating belt-type prepresses for compacting preshaped sections from the particle mat passing through on a conveyor belt to produce particle boards, etc. The belt comprises a core of textile cord fabric with smooth outer PVC layers and with perforations at predetermined spacing.

3 Claims, 1 Drawing Sheet

PRECOMPACTION BELT

BACKGROUND OF THE INVENTION

In the production of particle boards, fiber boards or the like, belt-type prepresses are universally used for compacting the particle carpet into preshaped sections downstream of the continuously operating spreading station. This is necessary because the particle mat, which in the majority of cases is applied in three layers; the central layer comprising coarse particles and the two cover layers comprising fine particles, does not have sufficient cohesion to withstand transportation as far as the hot press, in particular the multi-daylight hot press, without sustaining damage. Deep layer particle mats would furthermore also require large clearances of the press openings in the hot presses. The consolidation of the particle mat or its surfaces furthermore permits more rapid closure of the hot presses since less account has to be taken of particles and dust blowing away due to the air to be displaced.

In practice however, difficulties are constantly being encountered in precompaction such as adhesion of the particles to the precompaction belt. A slow throughput is furthermore necessary in order to avoid dust particles being blown out of the upper cover layer. When a precompaction belt made of plastics is used, the air builds up in the run-in wedge during the compaction of the particle carpet and, when the dust fraction is high, leads to striation of the upper cover layer. This striation leads to a reduction in quality, i.e. minimization of surface quality during coating of the particle board right up to minimization of strength on account of crack formation in the upper cover layers.

The use of coarsely woven monofilament and multifilament belts as the precompaction belt is also known, and these have good air permeability on account of their coarse fabric structure. However, these have only a limited life of four to six weeks. In addition to the costs for the new belt, lengthy fitting times and an interruption in production of several hours are always the result.

SUMMARY OF THE INVENTION

The invention is based on the recognition of these disadvantages and it is the object of the invention to provide a precompaction belt which avoids the disadvantages mentioned and has a long life.

To achieve this object, the invention has the following features: a core of textile cord fabric smooth outer layers coated on both sides with PVC, and perforations made at a constant minimum spacing with respect to one another in the precompaction belt. The precompaction belt according to the invention has the advantage that the smooth surface of the chosen material, PVC (polyvinylchloride) eliminates the risk of the ventilation holes becoming blocked and that the fabric reinforcement guarantees a substantially longer precompaction belt life.

The air can escape satisfactorily through the vent holes. A concomitant advantage is that the use of the precompaction belt according to the invention enables the throughput rate and thus the entire output of the precompactor to be increased by up to 50%.

BRIEF DESCRIPTION OF THE DRAWINGS

The invention is illustrated below with reference to the drawing, in which.

DESCRIPTION OF PREFERRED EMBODIMENTS

Figure 1:
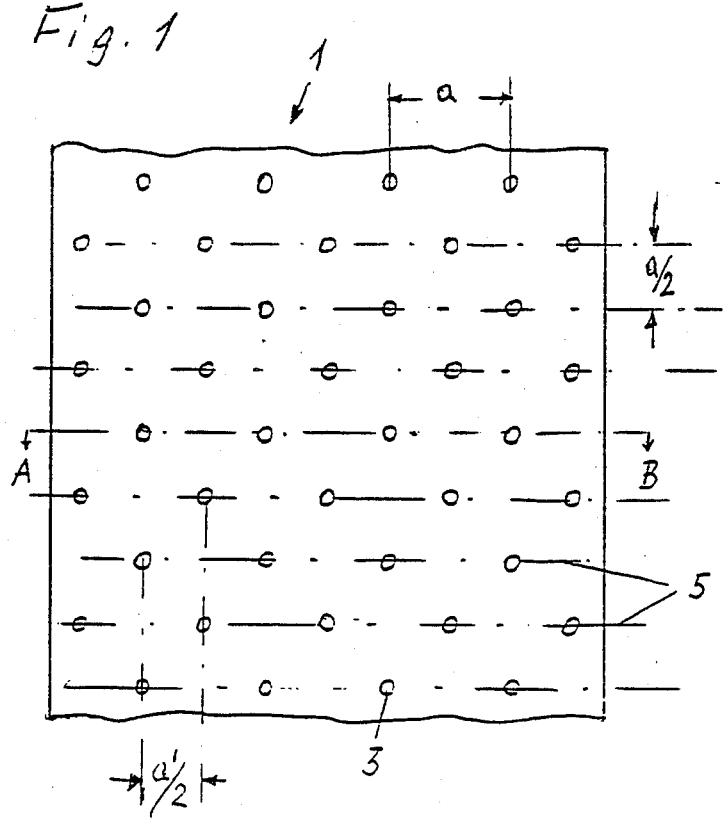
FIG. 1 shows the precompaction belt according to the invention in a plan view and FIG. 2 shows a cross section of the precompaction belt according to FIG. 1 in section A-B.
Figure 2:
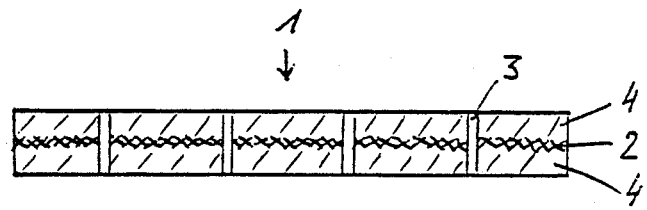

According to FIGS. 1 and 2, the precompaction belt 1 according to the invention comprises the central part or core 2 of textile cord fabric. The textile cord fabric 2 gives the PVC cover layers 4, applied in the form of coatings, the necessary tensile and tear strength. It has been found that the perforations 3 should preferably be made with a diameter of 5 mm and a minimum spacing "a" in a row 5 of holes of 50 mm with respect to one another. The rows 5 of perforation holes 3 should in each case be arranged offset by a/2 with respect to one another. The perforations 3 thus invariably form a square and are made at a spacing a/2 both along the length and across the width of the precompaction belt 1. These measurement data are advantageously applicable to most particle board thicknesses and with the conventional dust fraction to be produced in the cover layers.

I claim:

1. A precompaction belt for continuously operating belt-type prepresses for compacting preshaped sections from a particle mat passing through on a conveyor belt in the production of particle boards or the like which comprises a core of textile cord fabric and this with smooth outer layers, of PVC on both sides of the core, and perforations in the precompaction belt at a predetermined minimum spacing with respect to one another.

2. A precompaction belt as claimed in claim 1, wherein the perforations preferably have a diameter of 5 mm and have a spacing "a" with respect to one another of 50 mm in a row of holes.

3. A precompaction belt as claimed in claim 2, wherein the rows of holes are made offset with respect to one another at a spacing of "a"2, and the perforations of two rows of holes are likewise made offset by "a"/2 with respect to one another.

* * * * *